United States Patent
Jiang et al.

(10) Patent No.: US 11,145,852 B2
(45) Date of Patent: Oct. 12, 2021

(54) ANODE ACTIVE MATERIAL AND ANODE USING SAME, ELECTROCHEMICAL DEVICE AND ELECTRONIC DEVICE

(71) Applicant: NINGDE AMPEREX TECHNOLOGY LIMITED, Ningde (CN)

(72) Inventors: Daoyi Jiang, Ningde (CN); Hang Cui, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 111 days.

(21) Appl. No.: 16/299,409

(22) Filed: Mar. 12, 2019

(65) Prior Publication Data
US 2020/0212427 A1 Jul. 2, 2020

(30) Foreign Application Priority Data
Jan. 2, 2019 (CN) .......................... 201910002194.1

(51) Int. Cl.
*H01M 4/134* (2010.01)
*H01M 4/131* (2010.01)
(Continued)

(52) U.S. Cl.
CPC ........... *H01M 4/134* (2013.01); *H01M 4/131* (2013.01); *H01M 4/133* (2013.01); *H01M 4/366* (2013.01);
(Continued)

(58) Field of Classification Search
CPC ...... H01M 4/131; H01M 4/133; H01M 4/134; H01M 4/366; H01M 4/386; H01M 4/463;
(Continued)

(56) References Cited

U.S. PATENT DOCUMENTS

| 5,955,215 A | 9/1999 | Kurzweil et al. |
| 2008/0131778 A1* | 6/2008 | Watanabe ............. H01M 4/366 429/220 |

(Continued)

FOREIGN PATENT DOCUMENTS

| CN | 102122708 A | 7/2011 |
| CN | 103904295 A | 7/2014 |

(Continued)

OTHER PUBLICATIONS

Extended European Search Report dated Feb. 5, 2020 in the corresponding European patent application 191809375, 9 pages in English.

(Continued)

*Primary Examiner* — Brittany L Raymond
(74) *Attorney, Agent, or Firm* — Maier & Maier, PLLC (57) ABSTRACT

The present application relates to an anode active material and an anode, an electrochemical device and an electronic device using same. Specifically, the present application provides an anode active material, including a lithiated silicon-oxygen material and a coating layer, where there is at least a Si—O-M bond between the coating layer and the lithiated silicon-oxygen material, where M is selected from one or more of an aluminum element, a boron element and a phosphorus element. The anode active material of the present application has high stability and is suitable for aqueous processing to be prepared into an anode.

18 Claims, 2 Drawing Sheets

(51) Int. Cl.
  *H01M 4/133* (2010.01)
  *H01M 4/36* (2006.01)
  *H01M 4/38* (2006.01)
  *H01M 4/46* (2006.01)
  *H01M 4/58* (2010.01)
  *H01M 10/0525* (2010.01)
  *H01M 4/02* (2006.01)

(52) U.S. Cl.
  CPC .......... *H01M 4/386* (2013.01); *H01M 4/463* (2013.01); *H01M 4/5805* (2013.01); *H01M 10/0525* (2013.01); *H01M 2004/027* (2013.01)

(58) Field of Classification Search
  CPC .. H01M 4/483; H01M 4/5805; H01M 4/5825; H01M 2004/027; H01M 10/0525; Y02E 60/10
  See application file for complete search history.

(56) References Cited

U.S. PATENT DOCUMENTS

| | | | |
|---|---|---|---|
| 2014/0110639 A1 | 4/2014 | Yamamura | |
| 2018/0151873 A1* | 5/2018 | Matsuno | H01M 4/583 |
| 2018/0175377 A1* | 6/2018 | Hirose | C01B 33/32 |
| 2019/0214637 A1* | 7/2019 | Hirose | H01M 4/366 |

FOREIGN PATENT DOCUMENTS

| | | | |
|---|---|---|---|
| CN | 105280889 | A | 1/2016 |
| CN | 105981204 | A | 9/2016 |
| CN | 107210433 | A | 9/2017 |
| CN | 107636868 | A | 1/2018 |
| CN | 107710466 | A | 2/2018 |
| CN | 108172791 | A | 6/2018 |
| CN | 108232145 | A | 6/2018 |
| CN | 108269979 | A | 7/2018 |
| CN | 108461723 | A | 8/2018 |
| CN | 108565414 | A | 9/2018 |
| CN | 108701825 | * | 10/2018 |
| CN | 108701825 | A | 10/2018 |
| CN | 110444750 | A | 11/2019 |
| JP | 2015095291 | A | 5/2015 |
| WO | 2018096702 | A1 | 5/2018 |

OTHER PUBLICATIONS

Chinese First Office Action dated Dec. 3, 2020 in counterpart applicaton CN 20190002194, 9 pages in Chinese.

PCT International Search Report dated Mar. 5, 2020 in counterpart PCT applicaton PCT/CN2019/123348, 5 pages.

* cited by examiner

ANODE ACTIVE MATERIAL AND ANODE USING SAME, ELECTROCHEMICAL DEVICE AND ELECTRONIC DEVICE

CROSS REFERENCE TO RELATED APPLICATIONS

The present application claims the benefit of priority from the China Patent Application No. 201910002194.1, filed on 2 Jan. 2019, the disclosure of which is hereby incorporated by reference in its entirety.

BACKGROUND

1. Technical Field

The present application relates to the field of energy storage, and in particular to an anode active material and an anode, an electrochemical device and an electronic device using the same, particularly a lithium-ion battery.

2. Description of the Related Art

With the widespread use of electronic devices such as cameras, digital video cameras, mobile phones and notebook computers, people have higher perfoittiance requirements for electrochemical devices (e.g., lithium-ion batteries). Lithium-ion batteries have been widely used in various fields due to their high energy density, long cycle life, no memory effect, and the like. The silicon-oxygen material has the advantages of high capacity, low volume expansion, good cycle stability and the like, and thus, is most likely to be the anode active material for next-generation lithium-ion batteries. However, its first coulombic efficiency, which is generally less than 75%, has been an important reason for its limited practical application. In order to solve this technical problem, it has been proposed to pre-lithiate the silicon-oxygen material to increase its first coulombic efficiency to 90% or more. However, the pre-lithiated silicon-oxygen material is inferior in water-resistance tolerance to ordinary silicon-oxygen materials. Therefore, when water is used as a solvent to produce a pre-lithiated silicon-oxygen material slurry to then produce an anode, there is a problem with process incompatibility. When the slurry is formed into the anode, high-speed stirring and high-viscosity kneading operations are usually employed, which seriously damages the overall structure of the pre-lithiated silicon-oxygen material, and the highly reactive silicon nanoparticles therein are exposed and more easily come into contact with water, generating hydrogen gas, which seriously reduces capacity and the cycle stability of the material. Moreover, hydrogen or gelation is liable to be produced during the production of the lithiated silicon-oxygen material slurry, which would seriously affect the storage stability and safety of the material.

In view of the above, it is indeed necessary to provide a pre-lithiated silicon-oxygen anode active material which has high water-resistance tolerance to adapt to conventional aqueous processing, and an anode, an electrochemical device and an electronic device using the same.

SUMMARY

The embodiments of the present application solve at least one problem that exists in related fields, at least to some extent, by providing a pre-lithiated silicon-oxygen anode active material which has high water-resistance tolerance to adapt to conventional aqueous processing, and an anode, an electrochemical device and an electronic device using the same.

In one embodiment, the present application provides an anode active material having high water-resistance tolerance, which includes a lithiated silicon-oxygen material and a coating layer, where there is at least a Si—O-M bond between the coating layer and the lithiated silicon-oxygen material, where M is selected from one or more of an aluminum element, a boron element and a phosphorus element.

According to some embodiments of the present application, the lithiated silicon-oxygen material includes one or more of $Li_2SiO_3$, $Li_6Si_2O_7$, $Li_2Si_2O_5$ and $Li_4SiO_4$.

According to some embodiments of the present application, the coating layer includes a compound containing one or more of a phosphorus element, an aluminum element and a boron element.

According to some embodiments of the present application, the compound containing the phosphorus element is derived from one or more of phosphoric acid, tripolyphosphoric acid, sodium tripolyphosphate and potassium tripolyphosphate.

According to some embodiments of the present application, the compound containing the aluminum element is derived from one or more of sodium metaaluminate, potassium metaaluminate, aluminum trichloride and aluminum hydroxide.

According to some embodiments of the present application, the compound containing the boron element is derived from one or more of the following: boric acid, sodium tetraborate or a hydrate thereof, potassium tetraborate or a hydrate thereof, sodium metaborate or a hydrate thereof, and potassium metaborate or a hydrate thereof.

According to some embodiments of the present application, the compound containing any combination of the phosphorus element, the aluminum element and the boron element is derived from one or more of aluminum dihydrogen tripolyphosphate, aluminum phosphate, aluminum borate and aluminum tetrahydroborate.

According to some embodiments of the present application, the content of M is about 0.05 wt % to about 1.0 wt % of the coating layer. In some embodiments, the content of M is about 0.05 wt % to about 0.5 wt % of the coating layer. In some embodiments, the content of M is about 0.1 wt % to about 0.5 wt % of the coating layer. In some embodiments, the content of M is about 0.2 wt %.

According to some embodiments of the present application, the anode active material has an X-ray diffraction peak having a 2θ value of about 21.7±1°.

According to some embodiments of the present application, the lithiated silicon-oxygen material includes nano silicon grains, where the nano silicon grains have a grain size of less than about 10 nm. According to some embodiments of the present application, the nano silicon grains have a grain size of less than about 5 nm.

In another embodiment, the present application provides an anode, including a substrate and the anode active material according to the embodiments of the present application.

In another embodiment, the present application provides an electrochemical device, including a cathode and the anode according to the embodiment of the present application.

In another embodiment, the present application provides an electronic device, including the electrochemical device according to the embodiment of the present application.

The additional aspects and advantages of the embodiments of the present application will be described and illustrated in part in the subsequent description, or explained by the implementation of the embodiments of the present application.

BRIEF DESCRIPTION OF THE DRAWINGS

The drawings that are necessary to describe the embodiments of the present application or the existing technology will be briefly described below to facilitate the description of the embodiments of the present application. Obviously, the drawings in the following description are only partial embodiments of the present application. For those skilled in the art, the drawings of other embodiments can still be obtained according to the structures illustrated in the drawings without creative effort.

DETAILED DESCRIPTION

The embodiments of the present application will be described in detail below. The embodiments of the present application should not be construed as limiting the present application.

As used herein, the term "about" is used to describe and explain minor changes. When used in conjunction with an event or situation, the term may refer to examples where the event or situation occurs exactly and examples where the event or situation occurs very closely. For example, when used in conjunction with a numerical value, the term may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

I. Anode

The silicon-oxygen material is a material having good cycle stability (when it is higher than about 500 cycles, the capacity retention rate is still about 80% or above), high capacity (about 1500 to about 1800 mAh/g) and low cycle expansion (volume expansion below about 160%), and therefore, is suitable to serve as a material for the battery anode active substance according to the embodiments of the present application.

However, the silicon-oxygen material has high irreversible capacity, making its first coulombic efficiency generally less than about 75%. This problem has become the biggest obstacle limiting the application of the silicon-oxygen material. In this regard, some current lithiation manners (electrochemical, lithium source thermal sintering and solution methods) can increase the coulombic efficiency of silicon-oxygen to about 88% or above, but an obtained pre-lithiated silicon-oxygen material is generally incompatible with the conventional electrode aqueous processing method. For example, the lithiated material is liable to generate $H_2$ during the slurrying process, which seriously reduces capacity and the cycle stability of the material, or $H_2$ or gelation is liable to be produced, which seriously affects the storage stability and safety of the slurry. Therefore, according to the present application, the lithiated silicon-oxygen material having high water-resistance tolerance is more suitable to serve as an anode active material of a next-generation lithium-ion battery.

According to the embodiment of the present application, in the preparation of the anode, water is usually used as a solvent to disperse the anode active material in consideration of environmental protection, cost, safety and other issues. In order to obtain a good dispersion effect, high-strength kneading or high-speed dispersion is usually used during the processing, which inevitably destroys materials having low water-resistance tolerance. The buffer phase in the pre-lithiated silicon-oxygen material is typically composed of a mixture of a series of silicates (e.g., $Li_2SiO_3$, $Li_6Si_2O_7$, $Li_2Si_2O_5$, $Li_4SiO_4$ or a mixture thereof). These silicates do not have high water-resistance tolerance and will be subjected to hydrolytic polymerization in an aqueous system to produce a series of silicon-oxygen clusters. These silicon-oxygen clusters are highly susceptible to acid-base fluctuations in a slurry system to further polymerize causing gelation.

Further, according to the embodiment of the present application, in the preparation of the anode, water is usually used as a solvent to prepare the slurry. In this process, it is necessary to wet the material with a binder or dispersing agent by a high-speed shearing force, which seriously damages the overall structure of the anode active material. This causes the highly reactive silicon nanoparticles of the silicon-oxygen material in the anode active material exposed to more easily be in contact with water and generate hydrogen gas, thereby seriously reducing capacity and the cycle stability of the silicon-oxygen material. Besides, hydrogen gas generated during the large-scale preparation of the anode active material slurry seriously affects the storage stability and safety of the slurry.

It can be seen that the lithiated silicon-oxygen material has a certain negative impact during the processing process and storage stability of the slurry composed of the anode active material produced therefrom, which seriously affects the uniformity and effectiveness of coating.

In order to overcome the above problems, the present application provides a highly water-resistant anode active material to meet the conventional aqueous processing technique. The anode active material includes a lithiated silicon-oxygen material and a coating layer, where there is at least a Si—O-M bond between the coating layer and the lithiated silicon-oxygen material, where M is selected from one or more of an aluminum element, a boron element and a phosphorus element. In some embodiments, the coating layer further includes one or more of a hydrogen element and an oxygen element.

After hydrolysis, the lithiated silicon-oxygen material forms a hydrated layer mainly composed of silicon hydroxy groups on the surface of the silicon-oxygen material. The compound containing one or more of the phosphorus element, the aluminum element and the boron element generates an M-OH group which is easily bonded to the surface of the silicon-oxygen material after hydrolysis. The group can be further dehydrated and polymerized with the silicon hydroxy groups on the surface to form a network-like tight coating layer mainly composed of Si—O-M bonds on the surface of the silicon-oxygen material. The coating layer can effectively inhibit material collapse caused by hydrolysis of silicate, and is beneficial for maintaining the stability of the lithiated silicon-oxygen material during aqueous processing.

According to some embodiments of the present application, the lithiated silicon-oxygen material includes one or more of $Li_2SiO_3$, $Li_6Si_2O_7$, $Li_2Si_2O_5$ and $Li_4SiO_4$.

According to some embodiments of the present application, the coating layer includes a compound containing one or more of a phosphorus element, an aluminum element and a boron element.

According to some embodiments of the present application, the compound containing the phosphorus element is derived from one or more of phosphoric acid, tripolyphosphoric acid, sodium tripolyphosphate and potassium tripolyphosphate.

According to some embodiments of the present application, the compound containing the aluminum element is derived from one or more of sodium metaaluminate, potassium metaaluminate, aluminum trichloride and aluminum hydroxide.

According to some embodiments of the present application, the compound containing the boron element is derived from one or more of the following: boric acid, sodium tetraborate or a hydrate thereof, potassium tetraborate or a hydrate thereof, sodium metaborate or a hydrate thereof, and potassium metaborate or a hydrate thereof.

According to some embodiments of the present application, the compound containing any combination of the phosphorus element, the aluminum element and the boron element is derived from one or more of aluminum dihydrogen tripolyphosphate, aluminum phosphate, aluminum borate and aluminum tetrahydroborate.

According to some embodiments of the present application, the content of M is about 0.05 wt % to about 1.0 wt % of the coating layer. In some embodiments, the content of M is about 0.05 wt % to about 0.5 wt % of the coating layer. In some embodiments, the content of M is about 0.1 wt % to about 0.5 wt % of the coating layer. In some embodiments, the content of M is about 0.2 wt %.

According to some embodiments of the present application, the anode active material has an X-ray diffraction peak having a $2\theta$ value of about 21.7±1°.

According to some embodiments of the present application, the lithiated silicon-oxygen material includes nano silicon grains. In some embodiments, the nano silicon grains have an X-ray diffraction peak produced by a silicon (111) crystal plane having a $2\theta$ value of about 28.3±0.1° and a full width at half maximum of greater than about 0.81°. According to the Scherrer equation, the nano silicon grains have a grain size of less than about 10 nm. In some embodiments, the nano silicon grains have a grain size of less than about 5 nm.

According to some embodiments of the present application, the surface of the lithiated silicon-oxygen material is at least partially covered with a carbon layer having the thickness of about 5 nm to about 100 nm. In some embodiments, the carbon layer has the thickness of about 5 nm to about 80 nm. In some embodiments, the carbon layer has the thickness of about 5 nm to about 60 nm. In some embodiments, the carbon layer has the thickness of about 5 nm to about 40 nm. In some embodiments, the carbon layer has the thickness of about 5 nm to about 20 nm.

In another embodiment, the present application provides an anode, including a substrate and the anode active material according to the embodiments of the present application. In some embodiments, the substrate is copper foil.

II. Cathode

The cathode materials, compositions and manufacturing methods thereof applicable in the embodiments of the present application include any of the techniques well known to those skilled in the art. In some embodiments, the cathode is such described in U.S. Pat. No. 9,812,739B, which is incorporated herein in its entirety by reference.

In some embodiments, the cathode includes a current collector and a cathode active material layer on the current collector. The cathode active material includes at least one lithiated intercalation compound that reversibly intercalates and deintercalates lithium ions. In some embodiments, the cathode active material includes a composite oxide. In some embodiments, the composite oxide contains lithium and at least one element selected from cobalt, manganese and nickel.

In some embodiments, the cathode active material includes, but is not limited to:
$Li_aA_{1-b}X_bD_2$ (0.90≤a≤1.8, 0≤b≤0.5),
$Li_aE_{1-b}X_bO_{2-c}D_c$ (0.90≤a≤1.8, 0≤b≤0.5, 0≤c≤0.05),
$Li_aE_{2-b}X_bD_4$ (0.90≤a≤1.8, 0≤b≤0.5),
$Li_aE_{2-b}X_bO_{4-c}Dc$ (0.90≤a≤1.8, 0≤b≤0.5, 0≤c≤0.05),
$Li_aNi_{1-b-c}Co_bX_cD_\alpha$ (0.90≤a≤1.8, 0≤b≤0.5, 0≤c≤0.05, 0<α≤2),
$Li_aNi_{1-b-c}Co_bX_cO_{2-\alpha}T_\alpha$ (0.90<a≤1.8, 0≤b≤0.5, 0≤c≤0.05, 0<α<2),
$Li_aNi_{1-b-c}Co_bX_cO_{2-\alpha}T_2$ (0.90≤a≤1.8, 0≤b≤0.5, 0≤c≤0.05, 0<α<2),
$Li_aNi_{1-b-c}Mn_bX_cD_\alpha$ (0.90≤a≤1.8, 0≤b≤0.5, 0≤c≤0.05, 0<α≤2),
$Li_aNi_{1-b-c}Mn_bX_cO_{2-\alpha}T_\alpha$ (0.90≤a≤1.8, 0≤b≤0.5, 0≤c≤0.5, 0≤α≤2),
$Li_aNi_{1-b-c}Mn_bX_cO_{2-\alpha}T_2$ (0.90≤a≤1.8, 0≤b≤0.5, 0≤c≤0.5, 0≤α≤2),
$Li_aNi_bE_cG_dO_2$ (0.90≤a≤1.8, 0≤b≤0.9, 0≤c≤0.5, 0.001≤d≤0.1),
$Li_aNi_bCo_cMn_bG_eO_2$ (0.90≤a≤1.8, 0≤b≤0.9, 0≤c≤0.5, 0≤d≤0.5, 0.001≤e≤0.1),
$Li_aNiG_bO_2$ (0.90≤a≤1.8, 0.001≤b≤0.1),
$Li_aCoG_bO_2$ (0.90≤a≤1.8, 0.001≤b≤0.1),
$Li_aMnG_bO_2$ (0.90<a≤1.8, 0.001≤b≤0.1),
$Li_aMn_2G_bO_4$ (0.90≤a≤1.8, 0≤b≤0.5),
$QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2) or $LiFePO_4$, where A is selected from Ni, Co, Mn and any combination thereof; X is selected from Al, Ni, Co, Mn, Cr, Fe, Mg, Sr, V, rare-earth elements and any combination thereof; D is selected from O, F, S, P and any combination thereof; E is selected from Co, Mn and any combination thereof; T is selected from F, S, P and any combination thereof; G is selected from Al, Cr, Mn, Fe, Mg, La, Ce, Sr, V and any combination thereof; Q is selected from Ti, Mo, Mn and any combination thereof; I is selected from Cr, V, Fe, Sc, Y and any combination thereof; and J is selected from V, Cr, Mn, Co, Ni, Cu and any combination thereof.

In some embodiments, the cathode active material is selected from lithium cobaltate ($LiCoO_2$), a lithium nickel cobalt manganese (NCM) ternary material, lithium iron phosphate ($LiFePO_4$), lithium manganate ($LiMn_2O_4$) and any combination thereof. In some embodiments, the cathode active material is lithium cobaltate ($LiCoO_2$).

In some embodiments, the cathode active material may have a coating on its surface or may be mixed with another compound having a coating. The coating may include at least one coating element compound selected from an oxide of the coating element, a hydroxide of the coating element, an oxyhydroxide of the coating element, a bicarbonate of the coating element and a hydroxycarbonate of the coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combination thereof. The coating may be applied by any method as long as the method does not adversely affect the performance of the cathode active material. For example, the method may include spraying, dipping, and the like.

The cathode active material layer further includes a binder, and optionally includes a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, nylon, and the like. In some embodiments, the binder is poly(1,1-difluoroethylene).

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fibers and any combination thereof. In some embodiments, the carbon-based material is carbon black. In some embodiments, the metal-based material is selected from metal powder, metal fibers, copper, nickel, aluminum and silver. In some embodiments, the conductive polymer is a polyphenylene derivative.

In some embodiments, the current collector is aluminum.

The cathode may be prepared by a preparation method well known to those skilled in the art. For example, the cathode may be obtained by the following method: mixing an active material, a conductive material and a binder in a solvent to prepare an active material composition, and coating the active material composition on a current collector. In some embodiments, the solvent may include N-methylpyrrolidone or the like, but is not limited thereto.

III. Electrolytic Solution

Electrolytes applicable in the electrolytic solution of the embodiments of the present application include, but are not limited to, inorganic lithium salts, such as $LiClO_4$, $LiAsF_6$, $LiPF_6$, $LiBF_4$, $LiSbF_6$, $LiSO_3F$, $LiN(FSO_2)_2$ and the like; fluorine-containing organic lithium salts, such as $LiCF_3SO_3$, $LiN(FSO_2)(CF_3SO_2)$, $LiN(CF_3SO_2)_2$, $LiN(C_2F_5SO_2)_2$, cyclic lithium 1,3-hexafluoropropanedisulfonimide, cyclic 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; and lithium salts containing dicarboxylic acid complex, such as lithium bis(oxalate)borate, lithium difluorooxalate borate, lithium tris(oxalate) phosphate, lithium difluorobis(oxalate)phosphate and lithium tetrafluoro(oxalate)phosphate. Further, the above electrolytes may be used singly or in combination of two or more. For example, in some embodiments, the electrolyte includes a combination of $LiPF_6$ and $LiBF_4$. In some embodiments, the electrolyte includes a combination of an inorganic lithium salt such as $LiPF_6$, $LiBF_4$ or the like and a fluorine-containing organic lithium salt such as $LiCF_3SO_3$, $LiN(CF_3SO_2)_2$, $LiN(C_2F_5SO_2)_2$ or the like. In some embodiments, the concentration of the electrolyte is in the range of about 0.8 to about 3 mol/L, such as in the range of about 0.8 to about 2.5 mol/L, in the range of about 0.8 to about 2 mol/L or in the range of about 1 to about 2 mol/L, for example, about 1 mol/L, about 1.15 mol/L, about 1.2 mol/L, about 1.5 mol/L, about 2 mol/L or about 2.5 mol/L.

IV. Separator

In some embodiments, a separator is provided between the cathode and the anode to prevent short circuit. The material and shape of the separator which can be used in the embodiments of the present application are not particularly limited, and may be any technique well known to those skilled in the art. In some embodiments, the separator includes a polymer or inorganic material or the like formed of a material that is stable to the electrolytic solution of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, a polypropylene nonwoven fabric, a polyethylene nonwoven fabric or a polypropylene-polyethylene-polypropylene porous composite film may be used. In some embodiments, the separator is a polyethylene (PE) porous polymer film.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

V. Electrochemical Device

The electrochemical device of the present application includes any device that generates an electrochemical reaction, and its specific examples include all kinds of primary batteries, secondary batteries, fuel cells, solar cells or capacitors. In particular, the electrochemical device is a lithium secondary battery, including a lithium metal secondary battery, a lithium-ion secondary battery, a lithium polymer secondary battery or a lithium-ion polymer secondary battery. In some embodiments, the electrochemical device of the present application includes a cathode having a cathode active substance capable of occluding and releasing metal ions; an anode according to the embodiment of the present application; an electrolytic solution; and a separator arranged between the cathode and the anode.

VI. Electronic Device

The use of the electrochemical device of the present application is not particularly limited and can be used in any electronic device known in the existing technology. In one embodiment, the electrochemical device of the present application may be used for, but not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk, a transceiver, an electronic notebook, a calculator, a memory card, a portable recorder, a radio, a backup power, a motor, a car, a motorcycle, a power bicycle, a bicycle, a lighting fixture, a toy, a game console, a clock, an electric tool, a flash lamp, a camera, a large household storage battery, a lithium-ion capacitor and the like.

Hereinafter, a lithium-ion battery is taken as an example and is combined with specific embodiments to describe the preparation of the lithium ion battery. Those skilled in the art will appreciate that the preparation methods described in the present application are merely examples, and any other suitable preparation methods are within the scope of the present application.

EXAMPLES

The performance evaluation of the Examples of the lithium-ion battery according to the present application and Comparative Examples is explained below.

I. Preparation of Lithium-Ion Battery

1. Preparation of Anode

A modifier was added to 500 mL of a mixture of water and ethanol and stirred uniformly. 100 g of pre-lithiated silicon-oxygen material (C %=3.2%, D50=6.4 μm, silicon grain size being 5 nm, buffer phase being $Li_2SiO_3$) was added to the above solution, and stirred at 400 rpm for 6 hours to obtain a suspension. The suspension was filtered to obtain a solid. The solid was dried at 80° C. for 12 hours to obtain a dried material. The dried material was pulverized and sieved to obtain an anode active material (Examples 1 to 16).

Graphite, a modified pre-lithiated silicon-oxygen material, a conductive agent (conductive carbon black, Super P®) and a binder (modified polyacrylic acid, PAA) were mixed according to a mass ratio of 70%:15%:5%:10%, an appropriate amount of water was added, and kneading was performed at a solid content of 55%-70%. An appropriate amount of water was added to adjust the viscosity of the slurry to 4000-6000 Pa·s to prepare an anode slurry.

The obtained anode slurry was coated on an anode current collector copper foil, dried, and subjected to cold-pressing to obtain the anode.

2. Preparation of Cathode $LiCoO_2$, conductive carbon black and polyvinylidene fluoride (PVDF) were thoroughly stirred and uniformly mixed in a mass ratio of 95%:2.5%:2.5% in an N-methylpyrrolidone solvent system to obtain a cathode slurry. The obtained cathode slurry was coated on a cathode current collector aluminum foil, dried, and subjected to cold-pressing to obtain the cathode.

3. Preparation of Electrolytic Solution

In a dry argon atmosphere, in a solvent formed by mixing propylene carbonate (PC), ethylene carbonate (EC) and diethyl carbonate (DEC) (weight ratio 1:1:1), $LiPF_6$ was added and mixed uniformly, the concentration of $LiPF_6$ being 1.15 mol/L, and then 7.5 wt % of fluoroethylene carbonate (FEC) was added and mixed uniformly to obtain the electrolytic solution.

4. Preparation of Separator

A PE porous polymer film was used as a separator.

5. Preparation of Lithium-Ion Battery

The cathode, the separator and the anode were stacked sequentially, so that the separator was positioned between the cathode and the anode to perform a function of separation, and a bare battery cell was obtained by winding. The bare battery cell was put in an outer package, the electrolytic solution was injected, and packaging was performed. Techniques such as formation, degassing, trimming and the like were performed to obtain the lithium-ion battery.

II. Test Method

1. Method for Measuring Content of M in Coating Layer 0.2 g of the anode active material (Examples 1 to 16) was weighed and put in a beaker made of polytetrafluoroethylene (PTFE). After the measured value of a digital balance was stabilized, the weight of the sample was recorded to the nearest 0.0001 g. 10 mL of concentrated $HNO_3$ and 2 mL of HF were slowly added to the sample, placed on a 220° C. plate heater, and heated to digest to almost evaporate. 10 mL of nitric acid was slowly added, and heating was continued for digesting for about 15 min to allow the sample to be sufficiently dissolved. The dissolved sample was placed in a fume hood and cooled to room temperature. The sample solution was shaken up and slowly poured into a funnel with a single layer of filter paper, and the beaker and filter residues were rinsed 3 times. The solution was made to a volume of 50 mL at 20±5° C. and shaken. The ion spectral intensity of the filtrate was measured by an inductively coupled plasma optical emission spectrometer (PE 7000), and the ion concentration was calculated according to the standard curve so as to calculate the content of the element contained in the sample.

2. X-Ray Diffraction Characterization Method of Anode Active Material

An anode active material sample was placed in a circular pit having the diameter of 1 cm, the surface was smoothed, and the sample was scanned by an X-ray spectrometer (D8 Advance, Cu target X-ray source), the tilt angle 2θ being from 10° to 85°, and the scanning frequency being 3°/min.

3. Method for Evaluating Deposition of Anode Slurry

The anode active material slurry was stored for 48 hours, and the final viscosity of the anode slurry was measured. The final viscosity was compared with the initial viscosity, and when the viscosity reduction was less than 1000 Pa·s, it was recorded as no deposition; when the viscosity reduction was 1000-2000 Pa·s, it was recorded as slight deposition; and when the viscosity reduction was greater than 2000 Pa·s, it was recorded as severe deposition.

4. Method for Evaluating Gelation of Anode Slurry

The anode active material slurry was stored for 48 hours, and the particles of the lower layer of the anode slurry were measured by a dynamic light scattering method. When 50-100 μm particles appeared in the anode slurry, it was recorded as slight gelation; and when 100-1000 μm particles appeared in the anode slurry, it was recorded as severe gelation.

5. Method for Measuring Gas Production Rate of Anode Slurry 100 g of the anode active material slurry was sealed in a 250 mL closed vessel for 48 hours. The proportion of hydrogen produced by the gas chromatography was tested. According to the reaction principle, the other gases in the system were substantially unchanged, and the gas production rate was characterized by the volume ratio of hydrogen in the entire mixed system in the case where only hydrogen was generated.

6. Cycle Test Method for Lithium-Ion Battery

At 25° C., the battery was charged at a constant current of 0.7 C to 4.4V, charged at a constant voltage to 0.025 C, and allowed to stand for 5 minutes. Then, the battery was discharged at 0.5 C to 3.0V. The capacity obtained in the above steps was the initial capacity. The cycle test with 0.7 C charging/0.5 C discharging was performed, with the ratio of the capacity to the initial capacity in each step, and a small current recovery (charging at a constant current of 0.2 C to 4.4V, charging at a constant voltage to 0.025 C, standing for 5 minutes, and discharging at 0.2 C to 3.0V) was performed every 50 cycles to obtain the capacity decay curve.

III. Test Results

The following table shows the composition and stability (deposition, gelation and gas production rate) of the anode active material according to the comparative Examples of the existing technology and the examples of the present application.

Figure 1:
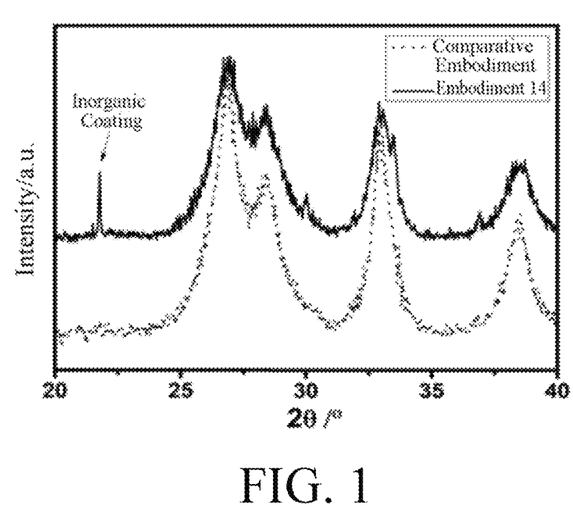
FIG. 1 shows an XRD diffraction spectrum of an anode active material according to Comparative Embodiment 1 and Embodiment 13.

After adding a modifier containing one or more of the phosphorus element, the aluminum element and the boron element to the substrate of the anode active material, the anode active material obtained in the present application has an X-ray diffraction peak having a 2θ value of 21.7±1° (as shown in FIG. 1), which indicates that one or more of the phosphorus element, the aluminum element and the boron element are present in the coating layer.

Figure 2:
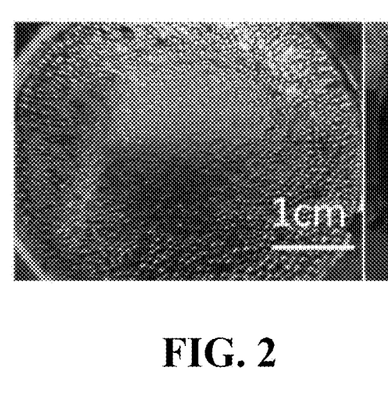
FIG. 2 shows the appearance of the anode slurry of Comparative Embodiment 1 after standing for 48 hours.
Figure 3:
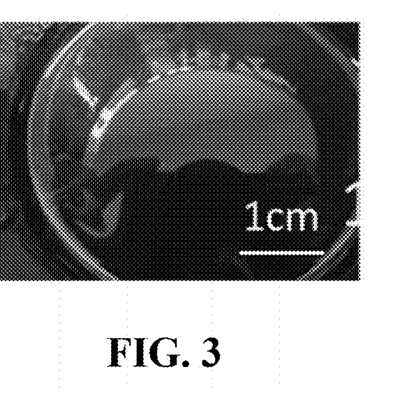
FIG. 3 shows the appearance of the anode slurry of Embodiment 11 after standing for 48 hours.

The results in the above table show that, in comparison with Comparative Example 1, a modifier containing one or more of the phosphorus element, the aluminum element and the boron element was added to the substrate of the anode active material in Examples 1-16, so that a Si—O-M bond (M was selected from one or more of an aluminum element, a boron element and a phosphorus element) was formed between the coating layer and the lithiated silicon-oxygen material of the anode active material, and thus, the deposition, gelation degree and/or gas production rate of the pre-lithiated silicon-oxygen anode active material can be remarkably reduced, thereby significantly improving the stability of the anode active material. As shown in FIGS. 2 and 3, the anode active material slurry of Comparative Example 1 caused severe deposition and severe gelation, while the anode active material slurry of Example 11 did not undergo deposition or gelation.

Examples 1-4 used a modifier containing the phosphorus element, Examples 5-7 used a modifier containing the alu-

| | Modifier | Content of M in coating layer (weight percent) | Deposition | Gelation | Gas production rate of hydrogen (volume percent) |
|---|---|---|---|---|---|
| Example 1 | 0.5 g 85% phosphoric acid | 0.104% P | No deposition | No gelation | Null |
| Example 2 | 0.5 g tripolyphosphoric acid | 0.134% P | Slight deposition | No gelation | 2.5% |
| Example 3 | 0.75 g sodium tripolyphosphate | 0.168% P | No deposition | No gelation | 1.5% |
| Example 4 | 0.75 g potassium tripolyphosphate | 0.124% P | Slight deposition | No gelation | 5.2% |
| Example 5 | 0.75 g sodium metaaluminate | 0.215% Al | No deposition | No gelation | 0.2% |
| Example 6 | 0.5 g aluminum trichloride | 0.098% Al | No deposition | Slight gelation | 10% |
| Example 7 | 0.65 g aluminum hydroxide | 0.198% Al | Slight deposition | Slight gelation | Null |
| Example 8 | 1 g boric acid | 0.146% B | Slight deposition | No gelation | 2% |
| Example 9 | 2 g sodium tetraborate | 0.213% B | No deposition | Slight gelation | Null |
| Example 10 | 1 g potassium tetraborate | 0.113% B | No deposition | Slight gelation | 1.5% |
| Example 11 | 0.75 g sodium tripolyphosphate 0.75 g sodium metaaluminate | 0.116% P 0.213% Al | No deposition | No gelation | Null |
| Example 12 | 0.5 g boric acid 0.6 g tripolyphosphoric acid | 0.136% B 0.153% P | No deposition | No gelation | 0.8% |
| Example 13 | 0.75 g aluminum dihydrogen tripolyphosphate | 0.052% Al 0.062% P | Slight deposition | Slight gelation | 16% |
| Example 14 | 2 g aluminum dihydrogen tripolyphosphate | 0.142% Al 0.138% P | No deposition | No gelation | 0.4% |
| Example 15 | 6.2 g aluminum dihydrogen tripolyphosphate | 0.510% Al 0.408% P | No deposition | No gelation | Null |
| Example 16 | 15 g aluminum dihydrogen tripolyphosphate | 1.02% Al 0.8% P | No deposition | No gelation | Null |
| Comparative Example 1 | — | — | Severe deposition | Severe gelation | 76% | minum element, Examples 8-10 used a modifier containing the boron element, and Examples 11-16 used a modifier containing a combination of the aluminum element, the boron element and/or the phosphorus element. The results show that the anode active material having composite elements has superior stability to the anode active material having a single aluminum element, boron element or phosphorus element.

Figure 4:
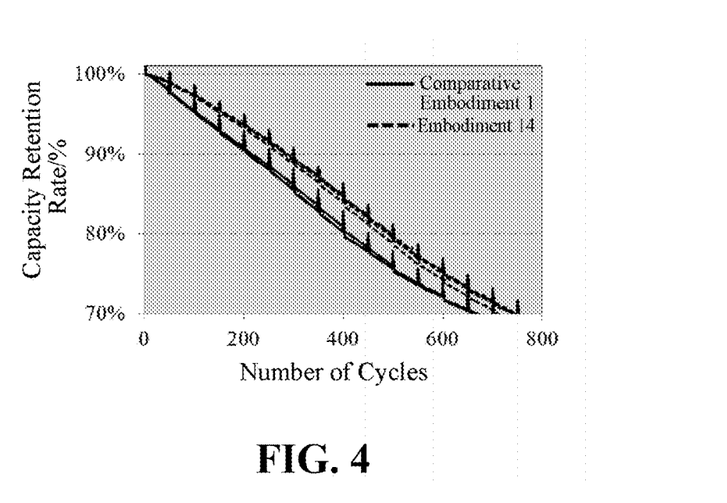
FIG. 4 shows the cycle decay curves of lithium-ion batteries prepared in Comparative Embodiment 1 and Embodiment 14.

Further, a lithium-ion battery prepared from the anode active material of the present application has good electrochemical performance (as shown in FIG. 4) compared to the existing technology.

The above examples only used $Li_2SiO_3$ as a buffer phase to prepare the anode active material, and evaluated its performance. These examples should not be construed as limiting the lithiated silicon-oxygen material. Other lithiated silicon-oxygen materials (e.g., one or more of $Li_6Si_2O_7$, $Li_2Si_2O_5$ and $Li_4SiO_4$) of the present application can achieve substantially the same effect as $Li_2SiO_3$.

References throughout the specification to "embodiments", "partial embodiments", "an embodiment", "another example", "examples", "specific examples" or "partial examples" mean that at least one embodiment or example of the present application includes specific features, structures, materials or characteristics described in the embodiments or examples. Therefore, descriptions appearing throughout the specification, such as "in some embodiments", "in the embodiments", "in an embodiment", "in another example", "in an example", "in a particular example" or "examples", are not necessarily referring to the same embodiments or examples in the present application. Furthermore, the particular features, structures, materials or characteristics herein may be combined in any suitable manner in one or more embodiments or examples.

Although the illustrative embodiments have been shown and described, it should be understood by those skilled in the art that the above-described embodiments are not to be construed as limiting the present application, and that variations, substitutions and modifications may be made to the embodiments without departing from the spirit, principle and scope of the present application.

What is claimed is:

1. An anode active material, comprising a lithiated silicon-oxygen material and a coating layer formed on the lithiated silicon-oxygen material,
   wherein there is at least a Si—O-M bond between the coating layer and the lithiated silicon-oxygen material,
   wherein M is selected from one or more of an aluminum element, a boron element, and a phosphorus element, and
   wherein the coating layer comprises a compound containing one or more of a phosphorous element, an aluminum element, or a boron.

2. The anode active material according to claim 1, wherein the lithiated silicon-oxygen material comprises one or more of $Li_2SiO_3$, $Li_6Si_2O_7$, $Li_2Si_2O_5$, and $Li_4SiO_4$.

3. The anode active material according to claim 1, wherein the compound containing the phosphorus element is derived from one or more of phosphoric acid, tripolyphosphoric acid, sodium tripolyphosphate, and potassium tripolyphosphate.

4. The anode active material according to claim 1, wherein the compound containing the aluminum element is derived from one or more of sodium metaaluminate, potassium metaaluminate, aluminum trichloride, and aluminum hydroxide.

5. The anode active material according to claim 1, wherein the compound containing the boron element is derived from one or more of the following: boric acid, sodium tetraborate or a hydrate thereof, and potassium metaborate or a hydrate thereof.

6. The anode active material according to claim 1, wherein the compound containing any combination of the phosphorus element, the aluminum element, and the boron element is derived from one or more of aluminum dihydrogen tripolyphosphate, aluminum borate, and aluminum tetrahydroborate.

7. The anode active material according to claim 1, wherein the content of M is about 0.05 wt % to about 1.0 wt % of the coating layer.

8. The anode active material according to claim 1, wherein the anode active material has an X-ray diffraction peak having a 2θ value of about 21.7±1°.

9. The anode active material according to claim 1, wherein the lithiated silicon-oxygen material comprises nano silicon grains, the nano silicon grains having a grain size of less than about 10 nm.

10. An anode, comprising a substrate and an anode active material comprising a lithiated silicon-oxygen material and a coating layer formed on the lithiated silicon-oxygen material,
    wherein there is at least a Si—O-M bond between the coating layer and the lithiated silicon-oxygen material,
    wherein M is selected from one or more of an aluminum element, a boron element, and a phosphorus element, and
    wherein the coating layer comprises a compound containing one or more of a phosphorous element, an aluminum element, or a boron element.

11. The anode according to claim 10, wherein the lithiated silicon-oxygen material comprises one or more of $Li_2SiO_3$, $Li_6Si_2O_7$, $Li_2Si_2O_5$, and $Li_4SiO_4$.

12. The anode according to claim 10, wherein the compound containing the phosphorus element is derived from one or more of phosphoric acid, tripolyphosphoric acid, sodium tripolyphosphate, and potassium tripolyphosphate.

13. The anode according to claim 10, wherein the compound containing the aluminum element is derived from one or more of sodium metaaluminate, potassium metaaluminate, aluminum trichloride, and aluminum hydroxide.

14. The anode according to claim 10, wherein the compound containing the boron element is derived from one or more of the following: boric acid, sodium tetraborate or a hydrate thereof, potassium tetraborate or a hydrate thereof, sodium metaborate or a hydrate thereof, and potassium metaborate or a hydrate thereof.

15. The anode according to claim 10, wherein the compound containing any combination of the phosphorus element, the aluminum element, and the boron element is derived from one or more of aluminum dihydrogen tripolyphosphate, aluminum borate, and aluminum tetrahydroborate.

16. The anode according to claim 10, wherein the content of M is about 0.05 wt % to about 1.0 wt % of the coating layer.

17. The anode according to claim 10, wherein the anode active material has an X-ray diffraction peak having a 2θ value of about 21.7±°.

18. The anode according to claim 10, wherein the lithiated silicon-oxygen material comprises nano silicon grains, the nano silicon grains having a grain size of less than about 10 nm.

* * * * *